UNITED STATES PATENT OFFICE.

GEORGE S. MARSHALL, OF EVERETT, MASSACHUSETTS.

COMPOUND FOR CULINARY USE.

SPECIFICATION forming part of Letters Patent No. 264,545, dated September 19, 1882.

Application filed August 2, 1882. (No specimens.)

*To all whom it may concern:*

Be it known that I, GEORGE S. MARSHALL, a citizen of the United States, residing at Everett, in the county of Middlesex and State of Massachusetts, have invented a new and Improved Compound for Culinary Use; and I do hereby declare that the following is a full, clear, and exact description of the same.

My invention relates to a new compound to be used in place of lard or butter for culinary purposes; and it consists in the method or process of purifying and deodorizing the ingredients and in the compound formed of the same, as hereinafter set forth and specifically claimed.

In a suitable tank or vessel, preferably a steam-jacket kettle, I place eight parts of water and twelve parts of stearine obtained from animal fats or vegetable oils, and subject the same to a boiling heat for about one hour. While the mass is boiling I place therein, to each one hundred pounds of stearine, five pounds of fine salt and one-half a pound of powdered orris-root. This boiling of the stearine in water serves to cleanse it of all impurities, while the orris-root deodorizes it and imparts an agreeable flavor thereto. After boiling the mass the specified time the heat is withdrawn, and it is then allowed to stand for about half an hour, when the stearine is drawn off into a suitable tank or vessel, to be afterward used in the compound. I next place in a suitable tank or vessel, preferably a steam-jacket kettle, refined cotton-seed oil or an equivalent vegetable oil, and subject the same to a heat of 150° to 190° Fahrenheit, keeping it constantly agitated, and during this heating process I stir into the mass and thoroughly incorporate therewith powdered orris-root, in the proportion of one pound of orris-root to each one hundred pounds of oil. This heating process, which serves to deodorize and flavor the oil, is continued for about one hour, after which the heat is withdrawn and the oil allowed to stand until it is thoroughly settled and cooled. The oil thus treated is then drawn off into a suitable tank or vessel, preferably a steam-jacket kettle, and united or mixed with the aforesaid purified and deodorized stearine, in the proportion of seventy-five parts of oil to twenty-five parts of stearine, and the mass is then subjected to a heat of about 150° Fahrenheit and kept constantly agitated for thirty to sixty minutes until the ingredients are thoroughly united or commingled. The compound is then drawn off into smaller tanks or churns, and churned for about half an hour at a temperature of 90° to 120° Fahrenheit, and it is then drawn off into cans, pails, tubs, tierces, or other packages, and is then ready for the market.

I have found that orris-root has a peculiar fitness, and is especially adapted for the purpose of deodorizing and flavoring the compound, as it possesses a much more delicate and agreeable flavor and odor and is more pleasant to the taste than any other substance heretofore used for flavoring compounds of this description, and consequently my improved compound is thereby rendered more appetizing and its market value proportionately enhanced.

I do not wish to confine myself to the exact proportions of the ingredients above described, nor to the precise degrees of heat employed in treating the same, as these may be varied to some extent without departing from the spirit of my invention.

I am aware that slippery-elm bark has been used for deodorizing, purifying, and flavoring cotton-seed and other vegetable oils and animal fats; and I do not claim this as any part of my invention.

What I claim as my invention, and desire to secure by Letters Patent, is—

1. The described method or process of deodorizing, purifying, and flavoring stearine obtained from animal fats or vegetable oils by boiling the same with water and mixing therewith powdered orris-root substantially in the proportions and in the manner and for the purpose set forth.

2. The described method or process of deodorizing, purifying, and flavoring cotton-seed oil or an equivalent vegetable oil by mixing therewith powdered orris-root, substantially in the proportions and in the manner and for the purpose set forth.

3. The described compound, formed by uniting refined cotton-seed oil or an equivalent vegetable oil, mixed with powdered orris-root, with refined stearine obtained from animal fats or vegetable oils and mixed with powdered orris-root, substantially in the proportions set forth, and for the purpose specified.

Witness my hand this 31st day of July, A. D. 1882.

GEORGE S. MARSHALL.

In presence of—
P. E. TESCHEMACHER,
C. M. BALL.